United States Patent [19]

Deakins

[11] 4,256,058
[45] Mar. 17, 1981

[54] AUTOMATIC AQUATIC FOOD DISPENSER

[76] Inventor: Thomas A. Deakins, Star Rte., Sequatchie, Tenn. 37374

[21] Appl. No.: 938,701

[22] Filed: Aug. 31, 1978

[51] Int. Cl.³ ............................................. A01K 5/02
[52] U.S. Cl. ............................... 119/51.11; 222/70; 222/308; 222/369
[58] Field of Search ............... 222/70, 306, 308, 333, 222/369, 368, 444; 119/51 R, 51.11

[56] References Cited

U.S. PATENT DOCUMENTS

| 699,699 | 5/1902 | Newberry | 222/369 X |
| 808,588 | 12/1905 | Tracy | 222/306 X |
| 848,101 | 3/1907 | Hale | 119/51 R |
| 2,820,577 | 1/1958 | Winters et al. | 222/306 |
| 2,847,066 | 8/1958 | Kleiber et al. | 222/368 X |
| 3,043,479 | 7/1962 | Gaukstern | 119/51 R X |
| 4,089,299 | 5/1978 | Suchowski | 119/51 R |

Primary Examiner—Charles A. Marmor
Attorney, Agent, or Firm—Fidelman, Wolffe & Waldron

[57] ABSTRACT

For automatically feeding aquatic animals in an aquarium tank, a cup attached to a rotating arm scoops granular food from a storage bin and releases the food to a discharge chute. The food falls under gravity onto the water surface in the tank. The capacity and rotational rate of the cup are variable.

3 Claims, 4 Drawing Figures

AUTOMATIC AQUATIC FOOD DISPENSER

BACKGROUND OF THE INVENTION

The present invention relates to food dispensers and more particularly to an automatic dispenser of granulated food for use with an aquarium. One of the foremost problems confronting the operators of aquariums, whether they be commercial operators or merely hobbyists, is the regular and quantitatively controlled feeding of the aquatic animals, e.g., fish. Regular feeding in suitable amounts helps to preserve the well being of the animals whereas overfeeding or non-feeding can lead to illness and death. While the hazards are always present with manual feeding techniques, the greatest danger arises when the owner or regular feeder person is away, as on the weekend or on vacation, and when the feeding task is omitted or is entrusted to another person less familiar with the aquarium's operation and maintenance.

SUMMARY OF THE INVENTION

The aquatic food dispenser of this invention includes a cup or scooplike device which becomes filled as it passes through a bin or reservoir containing particulate or granular food. The cup transports the food to a location where the food spills from the cup and separates from the dispenser via a discharge chute. The dispenser is mounted above the liquid surface of an aquarium tank which receives the dispensed food. An electric motor drives the cup at a preselected constant rate to provide for examples, one, two or more feedings per day. A movable bottom in the cup allows for setting the quantity of food which is dispensed at each feeding.

OBJECTS OF THE INVENTION

Accordingly, it is an object of the present invention to provide an aquatic food dispenser which automatically controls a regular schedule of feeding.

It is a further object of the present invention to dispense the same quantity of food at each feeding.

Yet another object of this invention is to provide an aquatic food dispenser wherein the quantity of food dispensed at a feeding may be varied.

Still another object of the present invention is to provide an aquatic food dispenser which is simple and economical in design and trouble free in operation.

Other objects, advantages and novel features of the present invention will become apparent from the following detailed description of the invention when considered in conjunction with the accompanying drawing in which.

Figure 1:
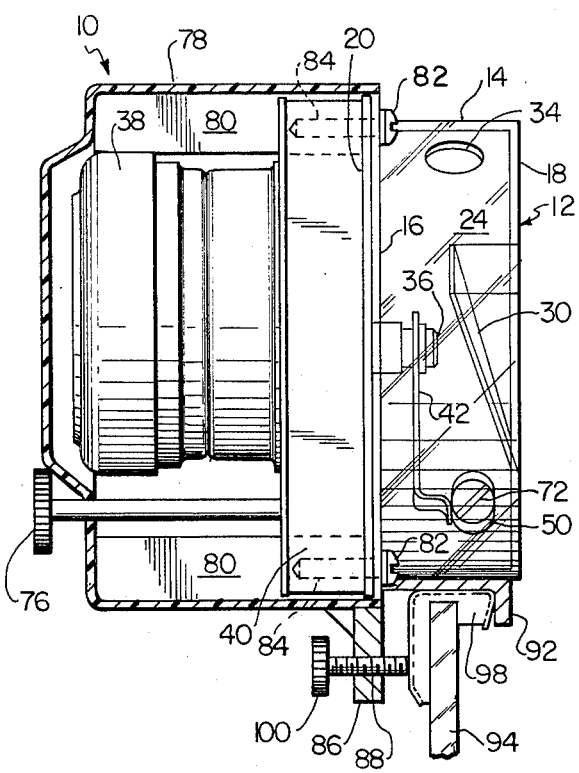
FIG. 1 is a side elevation, partially in crosssection, of the food dispenser of this invention shown mounted on the edge of an aquarium tank.
Figure 2:
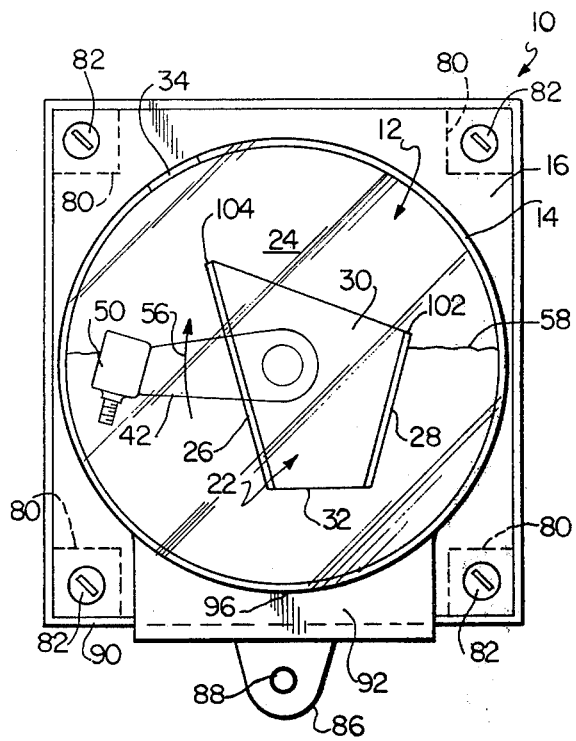
FIG. 2 is a front elevation of the food dispenser of FIG. 1.
Figure 3:
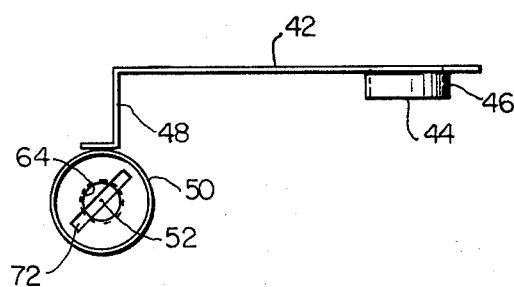
FIGS. 3 and 4 are the top and front elevational views respectively, to an enlarged scale, of the arm and cup in the food dispenser of FIG. 1.

With reference to FIGS. 1 and 2 the aquatic food dispenser 10 of this invention includes a food bin 12 having a cylindrical wall 14 intersecting at a right angle and integral with a planar rectangular flange 16. The front face 18 of the food bin 12 is circular and integral with the cylindrical wall 14. A rectangular back plate 20 is juxtaposed with the flange 16 to form a food reservoir between the cylindrical wall 14 and the front face 18 and back plate 20. The front face 18 has a quadrilaterally shaped opening 22 therethrough, however, the bin storage volume is accessible through the front opening 22 only by way of a chute comprised of three panels 26, 28, 30. The left side panel 26 is triangular with apex downward and extends perpendicularly inward from the front face 18. Panel 26 aligns with the left edge of the quadrilateral opening 22. The right side panel 28 is triangular with apex downward, and also extends perpendicularly inward from the front face 18 and aligns with the right edge of the quadrilateral opening 22.

The left and right panels 26, 28 are connected by the central planar panel 30 which bridges the space between the side panels 26, 28 and also connects with the lower edge 32 of the quadrilateral opening 22. The central panel 30 thus forms an inclined chute runway sloping downward and frontward and accessible only from the top and through the front face quadrilateral opening 22 in the food bin 12. A fill port opening 34 near the upper surface of the cylindrical wall 14 is used to fill the bin 12 with granular foodstuff.

The shaft 36 of the electic motor 38 extends perpendicularly through the backplate 20 into the substantially enclosed volume 24 of the food bin 12. A gear box 40 decreases the motor speed such that the shaft rotates at a rate of one revolution per day.

The arm 42 has at one end a circular opening 44 surrounded by a collar 46. The arm 42 is fixedly secured to the shaft 36, which passes through the arm opening 44, by any suitable means, for examples, a press fit, soldering, an adhesive. The arm 42 extends radially away from the shaft 36 paralleling the back plate 20. An L-shaped offset element 48 extends at the other end of the arm 42 at a right angle away from the arm 42 and towards the front face 18 of the food bin 12.

Figure 4:
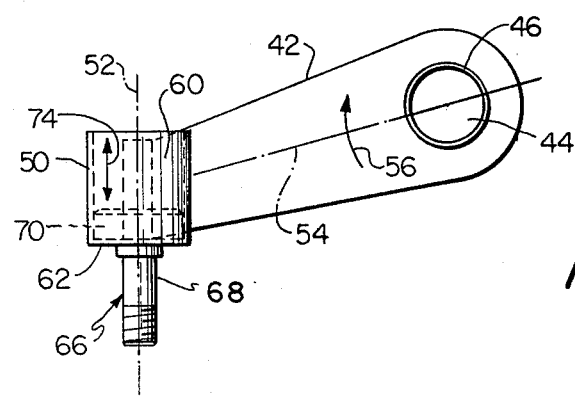

A cylindrical cup 50 is attached to the L-shaped element 48 by any suitable means e.g. adhesive, solder, with its longitudinal axis 52 in a plane substantially parallel to the back plate 20 and substantially perpendicular to the longitudinal axis 54 of the arm 42. The arm 42 is such that the attached cup 50 swings through a circle having a radius in the range of two-thirds to three-quarters of the bin radius so that the major portion of food stored in the food bin 12 is available to the rotating cup 50. It will be apparent that when the arm 42 and cup 50 rotate in the direction indicated in FIGS. 2, 4 by the arrow 56, granular food 58 will enter the forward or open end 60 of the cup 50 as the cup 50 enters the lower portion of the food bin 12, i.e. below the three o'clock position as seen in FIG. 2.

The L-shaped offset element 48 extends toward the front face 18 so that granular food carried in the cup 50 will spill from the cup 50, starting as the arm reaches a nearly vertical position (not shown), and fall on the inclined central panel 30 of the chute 26, 28, 30. The food slides down the panel 30 and enters the aquarium via the quadrilateral opening 22. The cup 50 moves without contacting the panels 26, 28, 30.

The closed end 62 of the cup 50 has a threaded hole 64 passing therethrough. Into this hole 64 is threaded a flat-headed machine screw 66 having its body 68 extending beyond the cup 50 and its head 70 within the cup 50. The diameter of the screw head 70 substantially equals the inside diameter of the cup 50 such that there is only a small clearance therebetween. By application and rotation of a screwdriver (not shown) in the slot 72 in the screw head 70, the depth 74, and the food holding capacity of the cup 50 is varied.

The electric motor 38 operates at a uniform speed and the arm 42 is set at any instantaneous angular position by turning of the thumbscrew 76 which is internally engaged with the gear box 40. Thus the time of day when feeding occurs can be set when power is first applied to the motor 38 and readjusted at any time thereafter.

A housing 78, shown in crossection in FIG. 1, surrounds the motor 38 and gear box 40. Four bosses 80, integral with the housing 78, provide flat mounting surfaces for the back plate 20 and the flange 16 of the food bin 12. Screws 82 pass through the corners of the back plate 20 and flange 16 and threadably engage holes 84 in the bosses 80, whereby an integral food dispenser is provided.

A tab 86 with a threaded hole 88 therethrough extends from the front lower edge 90 of the housing 78. A flange 92 extends from the front lower edge of the cylindrical wall 14 of the food bin 12. Both the flange 92 and tab 86 provide opposed flat parallel surfaces which also parallel the back plate 20. The food dispenser 10 is mounted to the vertical glass side 94 of an aquarium with the flange 92 positioned within the aquarium volume. The bottom 96 of the cylindrical wall 14 rests atop the aquarium frame 98, and a thumbscrew 100 threadably engaging the hole 88 is turned until the screw 100 firmly presses against the outside of the aquarium frame 98 and thereby holds the dispenser unit 10 in position at an upper edge of the aquarium.

In using the food dispenser 10, attachment is first made to the aquarium by using the thumbscrew 100 as described above. Then the food bin 12 is filled via the upper opening 34 with granular food 58 to a level not exceeding the upper edge 102 of the right side panel 28. It should be noted that the upper edge 104 of the left side panel is higher than the right panel 28 so that food, in addition to the contents of the cup 50, is not swept into the discharge chute by the motion of the arm 42 and cup 50 through the stored food 58. Then the motor 38 is energized to cause the arm to rotate at a uniform rate, and the arm 42 is set angularly by means of the thumbscrew 76 to cause food dispensing at a desired time of day.

It should be understood that in alternative embodiments of this invention, the motor 38 may be selected for any desired feeding frequency, e.g., alternate days, twice-a-day, or a variable speed motor may be utilized. Spring wound motors are also suitable where running time and regularity of drive are suited to the extended feeding cycle.

In an embodiment which performed satisfactorily, the arm 42 and cup 50 were of brass and soldered together. The food bin 12, made of clear lucite to give visibility to the food supply, had a three inch diameter and depth of approximately one inch. The back plate 20 and motor housing 78 were of opaque polypropylene.

From the preceding description of a preferred embodiment, it is evident that the objects of the invention are attained. Although the invention has been described and illustrated with detail, it is to be understood that the above is by way of illustration and example only and many modifications are possible which fall within the scope and spirit of this invention.

What is claimed:

1. A dispenser for granular food comprising:
   a food storage bin comprising a cylinder having a front face and back plate, said bin having a first opening for inputting of food for temporary storage, and a second opening on the front face thereof for the discharge of food from said dispenser;
   a cup, said cup movable within said food storage bin for collecting a portion of said food stored in said bin, conveying said collected food and discharging said collected food to said second opening;
   means for attachment of said dispenser to an aquarium, said attachment means locating said second opening such that food dispensed from said second opening falls into said aquarium; and
   an electric motor operating at constant speed for moving said cup, whereby food is collected, conveyed and discharged at uniformly timed intervals by the circular motion of said cup wherein said cup includes a rotatable screw threaded through the closed end of said cup, the head of said screw being within said cup, whereby the internal capacity of said cup is varied by rotating said screw,
   wherein said moving cup is connected to an arm which is connected to the output of said motor providing circular motion for said cup; and
   said second opening is of a quadrilateral shape having unequal edges and wherein connected panels within said food storage bin attach to three edges of said quadrilateral opening, said unattached edge of said opening being the upper most edge, whereby access for discharge of food through said second opening is from above said second opening.

2. The food dispenser of claim 1 wherein one lateral edge of said second opening extends higher than the opposed edge, and said moving cup after moving through said stored food, first approaches said more highly extended edge, whereby only food from said cup reaches said second opening for discharge.

3. A dispenser for granular food comprising:
   a food storage bin comprising a cylinder having a front face and back plate, said bin having a first opening for inputting food for temporary storage, and a second opening on the front face thereof for the discharge of food from said dispenser, said second opening being enclosed except from above by paneling within said storage bin;
   a means for attachment of said dispenser to an aquarium, said attachment means locating said second opening such that food dispensed from said second opening falls into said aquarium;
   a cup, said cup movable within said storage bin to collect a portion of said stored food and convey said food for discharge through said second opening, said cup being connected to a rotatable arm; said cup including a rotatable screw threaded through the closed end of said cup, the head of said screw being within said cup; whereby the internal capacity of said cup is varied by rotating said screw, and
   a motor having a selected constant speed output drive member, said arm being connected to said motor output drive member for rotation, said second opening is of a quadrilateral shape having unequal edges,
   wherein connected panels within said food storage bin attach to three edges of said quadrilateral opening, said unattached edge of said opening being the upper most edge, whereby access for discharge of food through said second opening is from above said second opening,
   whereby selected, uniform quantities of granular food are dispensed at regular timed intervals from said dispenser by the circular motion of said cup.

* * * * *